United States Patent [19]
Meyer

[11] Patent Number: 5,716,025
[45] Date of Patent: Feb. 10, 1998

[54] SPECIALLY CONFIGURED DEFLECTION EDGE THRUST REVERSER FOR JET ENGINE

[75] Inventor: Pascal J. Meyer, Clamart, France

[73] Assignee: Societe de Construction des Avions Hurel-Dubois, Meudon La Foret, France

[21] Appl. No.: 572,612

[22] Filed: Dec. 14, 1995

[30] Foreign Application Priority Data

Dec. 21, 1994 [FR] France .................................. 94 15389

[51] Int. Cl.⁶ .................................. B64C 33/04; F02K 1/64
[52] U.S. Cl. .................................. 244/110 B; 239/265.29; 239/265.41; 60/226.2; 60/230
[58] Field of Search .................................. 244/12.5, 23 D, 244/53 R, 110 B; 239/265.25, 265.29, 265.39, 265.37, 265.41; 60/226.2, 230

[56] References Cited

U.S. PATENT DOCUMENTS

| | | |
|---|---|---|
| 2,847,823 | 8/1958 | Brewer . |
| 3,667,680 | 6/1972 | Weed .................................. 244/110 B |
| 4,093,122 | 6/1978 | Linderman et al. . |
| 4,182,501 | 1/1980 | Fage . |
| 4,485,970 | 12/1984 | Fournier et al. . |
| 4,922,712 | 5/1990 | Matta et al. . |
| 4,976,466 | 12/1990 | Vauchel .................................. 244/110 B |
| 5,003,770 | 4/1991 | Schegerin et al. . |
| 5,224,342 | 7/1993 | Lair .................................. 244/110 B |
| 5,372,006 | 12/1994 | Lair . |

FOREIGN PATENT DOCUMENTS

| | | |
|---|---|---|
| 2 559 838 | 5/1988 | France . |
| 2 629 135 | 9/1989 | France . |
| 2 627 807 | 9/1989 | France . |
| 2 634 251 | 1/1990 | France . |
| 2 695 436 | 3/1994 | France . |
| 2 117 720 | 10/1983 | United Kingdom . |

*Primary Examiner*—Galen L. Barefoot
*Attorney, Agent, or Firm*—Young & Thompson

[57] ABSTRACT

The reverser includes a partition (28) exhibiting openings (19) and separating the cavity (16) which exists, when the doors (2) are in the closed position, between the front part (7) of the internal panel (11) of the door and the stream of gaseous flow (15) flowing in direct jet mode through the jet pipe CA, thus overcoming the aerodynamic losses which result from the presence of this cavity.

13 Claims, 4 Drawing Sheets

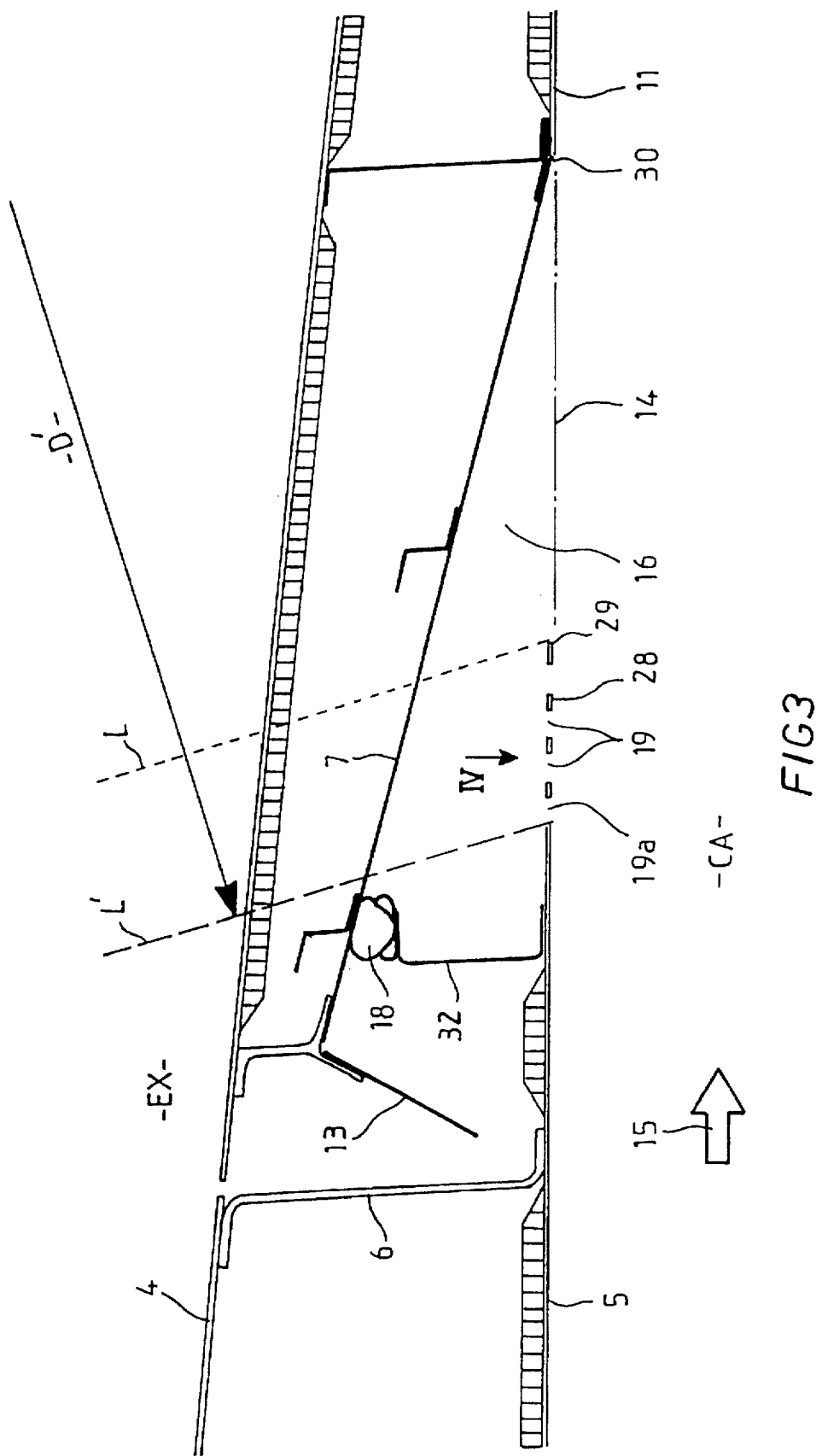

SPECIALLY CONFIGURED DEFLECTION EDGE THRUST REVERSER FOR JET ENGINE

FIELD OF THE INVENTION

The present invention relates to an improvement to thrust reversers for jet engines, with or without dilution of the main jet, intended especially to be mounted on an aircraft.

More particularly, it relates to thrust reversers of the known type having pivoting doors articulated to a cowling surrounding the engine, which reverser includes an internal panel delimiting, together with said cowling, a pipe in which a gaseous flow flows, known as a "jet pipe", it being possible for the doors to move from a retracted or cruise position in which they are in the extension of the cowling and allow the flow to flow in direct jet mode, to a deployed or reversal position in which they at least partially close off the jet pipe and open up a flow deflection well formed in the internal panel of the cowling and allowing the flow to escape radially toward the exterior and toward the upstream end of the engine.

BACKGROUND OF THE INVENTION

For this purpose, doors of this type are generally equipped at their upstream end with a deflection spoiler and they exhibit an internal panel which, when the doors are in the retracted position, is separated radially toward the exterior with respect to the surface of the internal panel of the cowling, an empty space or cavity thus being formed, in the region of the deflection well, between each door and the external boundary of the stream of gaseous flow determined by the surface of the internal panel of the cowling. FR-A-2 506 843 and FR-A-2 559 838 describe such devices.

However, in these known devices, although the existence of the deflection spoiler provides optimum outflow of the deflected flow when the doors are open, the presence of the empty space or cavity—when the doors are in the closed position—causes a distortion of the flow in direct jet mode and disturbances which are detrimental to operation in forward thrust mode because of the aerodynamic losses which result therefrom.

To overcome this drawback, various solutions have already been proposed, especially by FR-A-2 627 807, FR-A-2 634 251, FR-A-2 635 825 and FR-A-2 629 135, for example. These solutions essentially consist either in reducing the length of the deflection spoiler, or in adding, to the door or to the internal partition of the cowling, a moving part which closes off the cavity when the door is closed. These solutions exhibit either the drawback of reducing the passage cross section of the deflection well or of complicating the door or cowling structure and making it heavier.

SUMMARY OF THE INVENTION

The present invention proposes a simple and economical solution, consisting of separating the cavity from the stream of gaseous flow by a partition, attached to the internal panel of the cowling and pierced with openings placing said cavity in communication with the jet pipe.

The partition is stationary and advantageously aligned with the surface of the internal partition of the cowling, thus merging with the theoretical envelope for perfect aerodynamic delimitation of the stream of the flow of gases flowing in direct jet mode. By altering the number, size and density of the openings made in the partition, different requirements may be met. Thus in certain extreme cases, the partition which extends over part of the deflection well, starting from the upstream edge thereof, may extend along the entire region of the cavity.

According to a preferred embodiment of the invention, the openings pierced in the partition will advantageously have the shape of oblong slots, these slots making it possible to act upon the circumferential distribution of the flows deflected by the deployed reverser by envisaging a slot per unit surface area density which varies depending on the region. Likewise, by altering the overall orientation of the major axis of the slots it will be possible to give the deflected flow the desired local orientation. Thus the slots may in some cases be oriented either parallel to the axis of the engine, or transversely, or alternatively at an angle with respect thereto.

Moreover, the total surface area of the openings in the partition will have to be calculated such that, despite the presence of the partition partially closing off the deflection well, the reverse flow can be exhausted without restriction.

In order not to downgrade the quality of the outflow it is ensured that, in the doors closed position, the pressure prevailing in the cavity is the same as that prevailing in the jet pipe, this being made possible both by the existence of the openings in the partition and by the fact that the stationary part of the cowling includes, close to the upstream edge of the deflection well, a sealing means with which the internal panel of the door interacts when the door is in the closed position, so as to isolate the cavity from the ambient medium external to the engine.

BRIEF DESCRIPTION OF THE DRAWINGS

The invention is now described with reference to the appended drawings in which:

FIG. 3 is a part longitudinal sectional view of a reverser according to the invention.

DESCRIPTION OF THE PREFERRED EMBODIMENT

Figure 1:
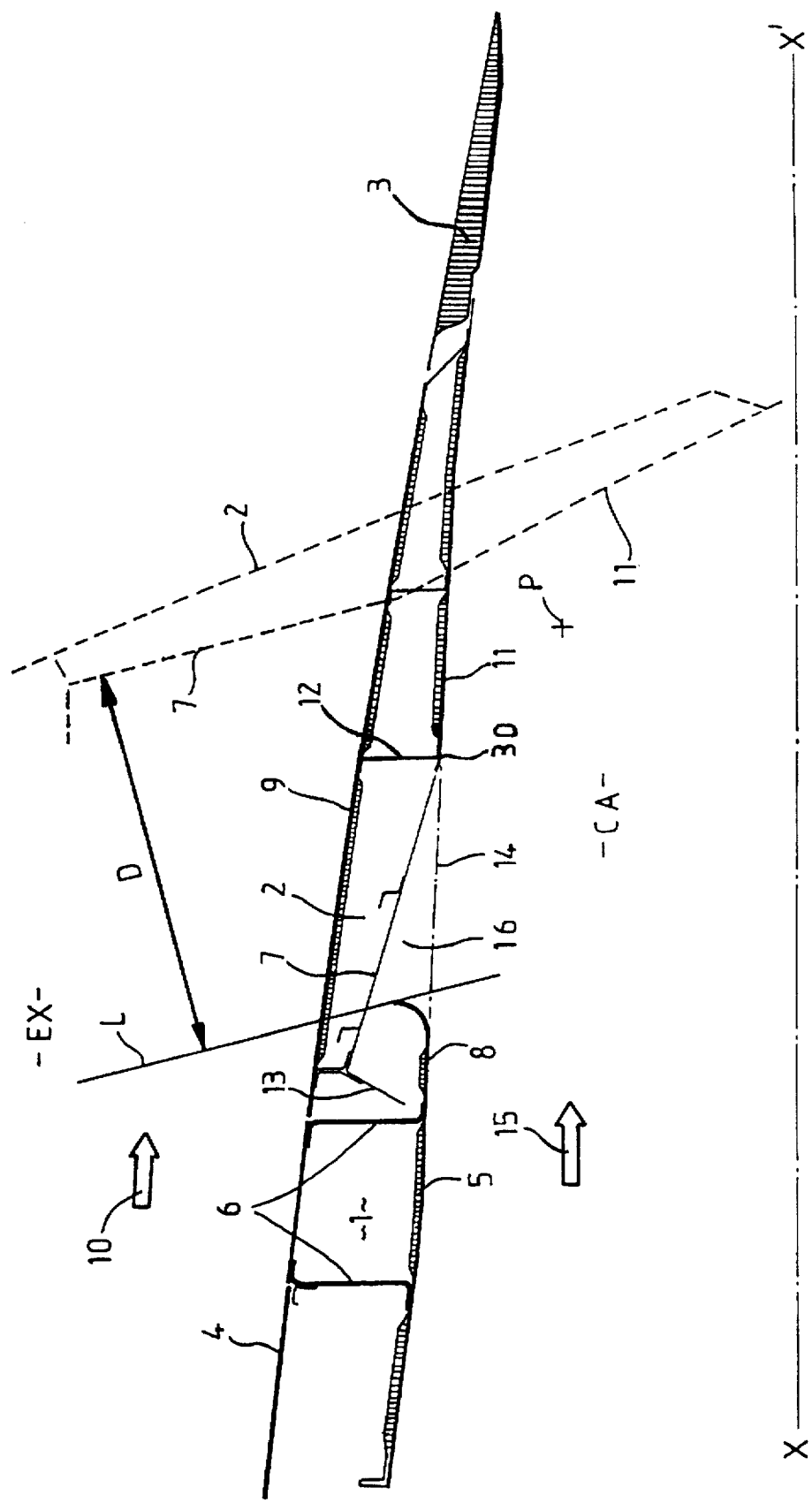
FIG. 1 represents, viewed in longitudinal section, a diagram of a reverser with doors of the type known prior to the invention.

FIG. 1 of the attached drawings shows, for the sake of clarity of the explanation, a known embodiment of a door-type reverser, composed of three main parts, namely, from the upstream end to the downstream end with reference to the direction of flow of the jetstream in direct jet mode (not deflected): an upstream stationary part 1 situated in the extension of the external wall of the jet pipe, the longitudinal axis of which has been represented as X–X', moving doors 2 and a stationary rear shroud 3. The upstream stationary part 1 comprises an external nacelle panel 4, an internal panel 5 externally bounding the stream of the gaseous flow of the engine symbolized by the arrow 15 and an upstream structure 6 composed either of a front frame or of a front box-type structure which joins said panels 4 and 5. The upstream structure 6 also serves as a support for the device for controlling the displacement of the moving doors 2 which are articulated in tilting fashion on pivots P integral with the stationary part of the engine cowling. The number of doors may vary depending on the specific application; for example two, three or four doors forming an annular assembly, possibly in cooperation with a stationary part, depending on the way in which the propulsion unit consisting of the turbo jet is mounted on the airplane. Even though we are in the process of reminding ourselves of the prior art, as far as the doors are concerned, reference may be made to FIG. 2 which shows, in a perspective view, one embodiment of a thrust reverser according to the invention in an application including two doors, each door being associated with a means for controlling its displacements, such as a jack 17. In the open position, the doors 2 open up a deflection well indicated as D' in the engine cowling, the difference between the well D' of the invention and the well D of the prior art being explained later.

As emerges from FIG. 1, the deflection well D is bounded, on the downstream side, by the front part 7 of the internal wall 11 of the door 2 and, on the upstream side, by the surface L parallel to the overall direction of the door 2 in the open position and passing through the downstream end of a deflection edge 8 in which the stationary part 1 of the cowling terminates, the deflection edge 8 being fixed under the upstream structure 6. Each door 2 is composed of an external panel 9 which, in the direct jet position, is placed in the extension of the external panel 4 of the upstream stationary part 1 to constitute the continuous aerodynamic wall bounding the flow external to the engine and represented by the arrow 10; of an internal panel 11 and of an interior structure 12 which joins the panels 9 and 11. The door 2 is supplemented at its upstream end by a deflection spoiler 13 intended to route the reversed outflow when the reverser is in the thrust reversal position, that is to say with the door 2 in the open or deployed position (FIG. 2 and the position in dotted line in FIG. 1). For the door 2 to give satisfactory performance in the open or thrust reversal position, it is usually necessary, as in the known example represented in FIG. 1, for the front part 7 of the internal panel 11 to be separated, in an outward radial direction, from a theoretical surface represented by the line 14 and corresponding to the theoretical envelope for perfect continuous aerodynamic delimitation of the stream of the gasflow in direct jet mode, internal to the engine, represented by the arrow 15. A cavity 16 is thus formed on the inside of the door 2 when it is in its closed position. In direct jet mode, some of the flow penetrates the cavity 16, thus creating distortion of the flow and disturbances in the outflow. This results in aerodynamic losses which are detrimental to operation in forward thrust mode.

The invention is now described with reference to FIGS. 2, 3 and 4a to 4d in which the members which are similar to those of FIG. 1 are denoted by the same reference numerals.

As may be seen particularly in FIG. 3, a partition 28 integral with the internal panel 5 extends between the internal pipe CA in which the gasflow 15 flows in direct jet mode and the cavity 16. This partition 28 is stationary and merges with the aforementioned line 14 in the extension of the internal panel 5 of the cowling and of the downstream part of the internal panel 11 of the door or of the internal panel of the rear shroud 3.

In the example represented, the partition 28 covers only part of the cavity 16 but it could extend over the entire length thereof. In any case, it extends over only part of the deflection well D', thus leaving sufficient passage cross section for the reversed flow.

Moreover, the partition 28 is pierced with openings 19 which cause the internal pipe CA to communicate with the interior of the cavity 16, so that the upstream edge of the deflection well D' may be taken to correspond not to the surface L as in FIG. 1, but to the surface L', parallel to L and passing through the upstream edge of the furthest upstream opening 19a of the partition 28. It will be understood that, by comparison to the prior art illustrated in FIG. 1, the open surface area along the line 14 between the surface L' delimiting the upstream end of the deflection well D' and the line 30 starting from which the front part 7 of the internal panel 11 of the door is radially separated from the rest of the panel, is reduced according to the invention since this surface area corresponds to the sum of the surface areas of the openings 19 in the partition 28, and of the surface area remaining open between the downstream edge 29 of the partition and the line 30.

Figure 2:
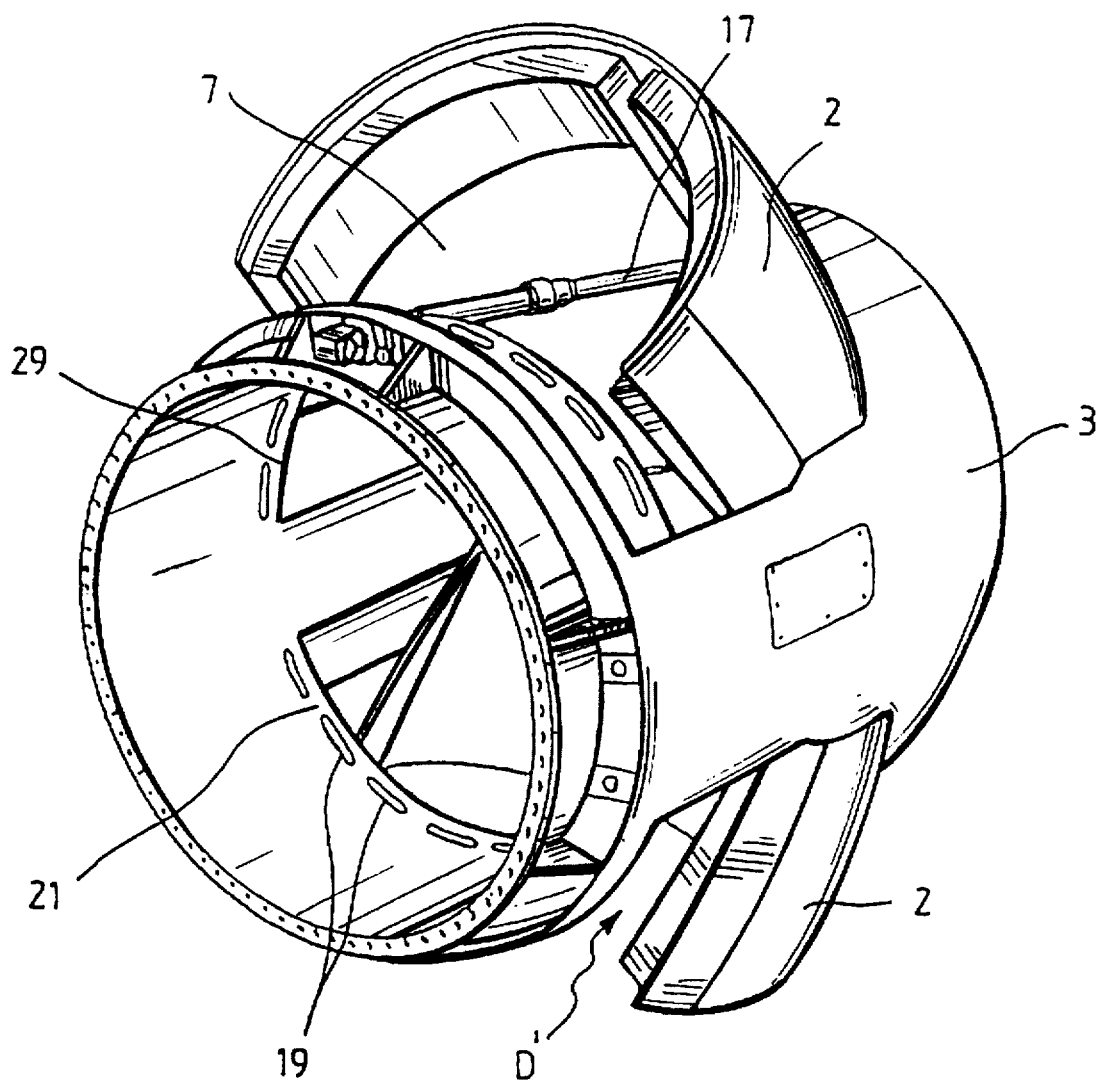
FIG. 2 is an overall perspective view of a reverser with two doors in the open position, equipped according to the invention.

In FIG. 2, in order not to clutter the drawing, just one peripheral series of openings 19 in the partition 28 has been represented.

As may be seen in FIG. 3, the stationary structure of the cowling includes a piece 32 equipped with a seal 18 situated substantially in the region of the upstream edge of the deflection well D' and against which the front part 7 of the internal door panel rests when the door is in the retracted or closed position, so as to isolate the cavity 16 from the ambient medium EX external to the engine.

In this way, the cavity 16 is isolated from the exterior space EX surrounding the engine and, when the engine is operating in direct jet mode (doors closed), the static pressure in the cavity 16 is almost identical to the pressure prevailing in the internal pipe CA. As a result of this, the outflow of the gasflow 15 in direct jet mode through said pipe CA is not affected by the presence of the openings 19.

In contrast, when the engine is operating in reversed jet mode, opening the door 2 means that the cavity 16 is placed in communication with the ambient air of the space EX and the static pressure in the cavity 16 drops since the pressure prevailing outside the engine is less than that in the internal pipe CA. A strong variation in pressure across the partition 28 thus arises, which allows the deflected flow to flow out correctly through the deflection well D'.

The shape, arrangement and number of openings 19 in the partition 28 may be arbitrary and will depend on the aerodynamic performance to be respected.

Figure 4A:
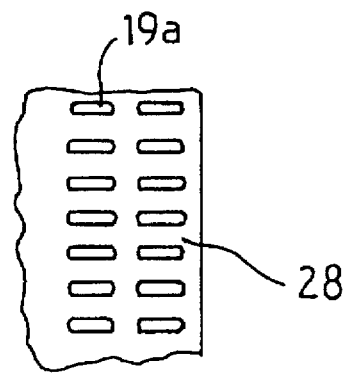
FIGS. 4a, 4b, 4c and 4d are part views, in the direction of the arrow IV of FIG. 3, of partitions according to various embodiments.
Figure 4B:
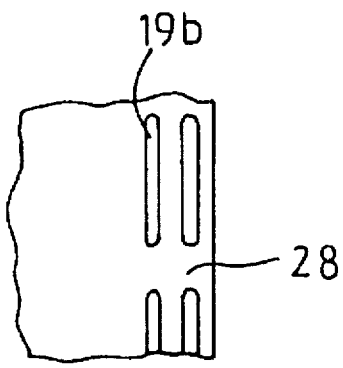
Figure 4C:
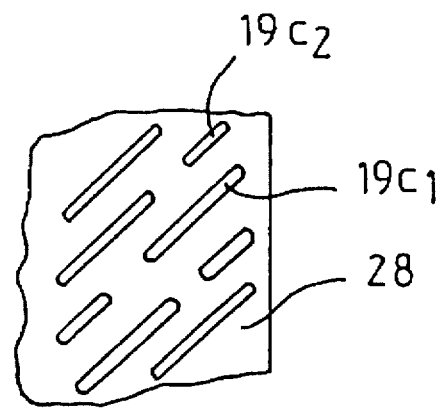

However, a preferred shape for the openings 19 will be that of oblong slots, the major axis of which may be parallel to the axis of the engine as represented as 19a in FIG. 4a or transverse to the axis of the engine as represented as 19b in FIG. 4b. In some cases, the major axis of the slots may be at an angle with respect to the said axis, as represented in FIG. 4c, possibly with an alternation of oblong slots $19c_1$ and shorter slots $19c_2$.

Figure 4D:
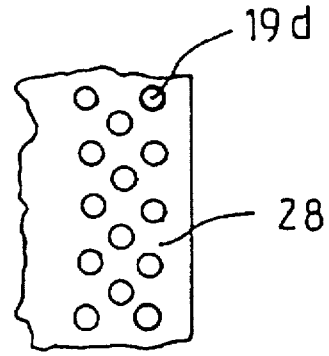

It would also be possible, as in FIG. 4d, to provide by way of openings just a multitude of holes 19d arranged, for example, in a staggered configuration.

It would also be possible simply to make the partition 28 using a porous material, the pores of which would act as the desired openings.

The selection of the shape, density, dimensions and orientation of the openings makes it possible to alter the distribution and guidance of the airflows deflected by the reverser in the doors deployed position.

Depending on the type of material used for the partition 28, if the material is not naturally porous, the openings will be obtained either by machining, in the case of a metal partition, or by molding or routing in the case of composite materials.

I claim:

1. A thrust reverser for a jet engine, especially for an aircraft, of the type having pivoting doors articulated to a cowling surrounding the engine, said reverser comprising: an internal panel delimiting, together with said cowling, a jet pipe in which a gaseous flow flows, said doors being movable from a retracted cruise position in which they are in the extension of the cowling and allow said gaseous flow to flow in direct jet mode, to a deployed reversal position in which said doors at least partially close off the jet pipe and open a flow deflection well formed in the internal panel of the cowling and allowing the flow to escape radially toward the exterior and toward the upstream end of the engine, said doors being equipped at their upstream end with a deflection spoiler and having an internal panel which, when the doors are in the retracted position, is separated, radially toward the exterior, from the surface of the internal panel of the cowling, an empty cavity thus being formed, in the region of the deflection well, between each of said door and an external boundary of the gaseous flow determined by a surface of the internal panel of the cowling, wherein, to avoid, in direct jet mode, disturbances due to a presence of said cavity, the cavity is separated from the gaseous flow by a partition attached to the internal panel of the cowling and pierced with openings placing the cavity in communication with the jet pipe.

2. The thrust reverser as claimed in claim 1, wherein the partition is aligned with the surface of the internal panel of the cowling.

3. The thrust reverser as claimed in claim 1, wherein the partition extends over part of the deflection well starting from the upstream edge thereof.

4. The thrust reverser as claimed in claim 1, wherein there is provided, on the stationary part of the cowling, close to the upstream edge of the deflection well, a sealing means with which the internal panel of the door interacts when the door is in the retracted position, so as to isolate the cavity from the ambient medium external to the engine.

5. The thrust reverser as claimed in claim 1, wherein the openings pierced in the partition have the shape of oblong slots.

6. The thrust reverser as claimed in claim 1, wherein the openings pierced in the partition have the shape of oblong slots arranged parallel to the axis of the engine.

7. The thrust reverser as claimed in claim 1, wherein the openings pierced in the partition have the shape of oblong slots arranged transversely to the axis of the engine.

8. The thrust reverser as claimed in claim 1, wherein the openings pierced in the partition have the shape of oblong slots arranged at an angle with respect to the axis of the engine.

9. The thrust reverser as claimed in claim 1, wherein the partition is obtained from a porous material, in which the pores act as openings.

10. The thrust reverser as claimed in claim 1, wherein the downstream end of the partition terminates in a rounded portion.

11. The thrust reverser as claimed in claim 1, wherein the partition is equipped with a mechanical device serving to improve the aerodynamic performance.

12. The thrust reverser as claimed in claim 1, wherein the partition is equipped with a moving part serving to improve the aerodynamic performance, which moving part can be operated by articulated members controlled by the means which move the doors between their retracted position and their deployed position.

13. The thrust reverser as claimed in claim 1, wherein the partition is equipped with a moving lip serving to improve the aerodynamic performance, which moving lip can be operated by articulated members controlled by the means which move the doors between their retracted position and their deployed position.

* * * * *